Patented Mar. 15, 1932

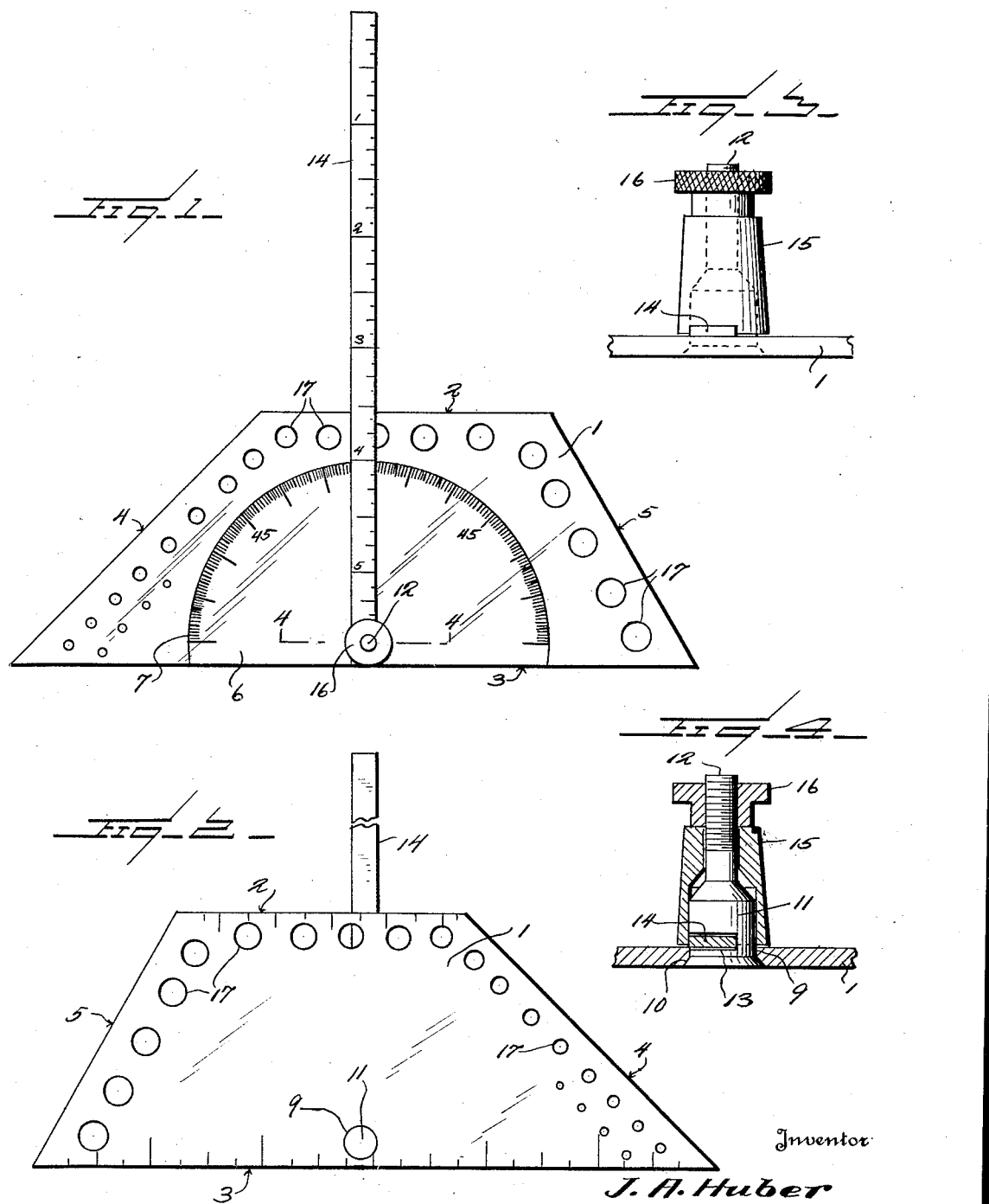

1,849,575

UNITED STATES PATENT OFFICE

JACOB ASH HUBER, OF LOUISVILLE, OHIO

MACHINIST'S INSTRUMENT

Application filed November 23, 1929. Serial No. 409,334.

This invention relates to geometrical instruments and pertains particularly to an improved instrument designed primarily for the use of machinists.

The primary object of the present invention is to provide an instrument of a compound nature whereby measurements of different natures may be made easily and quickly such as for example as laying off angles of different degrees; for determining the size of a particular drill; for determining the depth of a bore or pocket and for laying off straight lines.

The invention broadly contemplates the provision of a plate having a pair of scaled parallel straight edges and a pair of angularly disposed edges one of which is preferably of forty-five degrees, the other being disposed at thirty degrees to the straight edges. One face of the plate is graduated to form a protractor within the outline of which is fixed a post adapted to hold a relatively long scale in position either for laying off an angle of a desired degree or for determining the depth of a cut or bore.

Another object of the invention is to provide an improved means for securing a scale of the character described to a plate.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claim.

In the drawings:—

Figure 1 is a plan view of the instrument.

Figure 2 is a plan view of the reverse side from Figure 1.

Figure 3 is an elevational view of the scale securing stud.

Figure 4 is a section taken on the line 4—4 of Figure 1.

Referring more particularly to the drawings wherein like numerals of reference indicate corresponding parts throughout the several views, the numeral 1 indicates generally a plate having the longitudinal substantially parallel edges 2 and 3 respectively along which on one face of the plate may be formed graduations for facilitating the making of measurements in inches.

One end of the plate is cut at an angle of approximately forty-five degrees as indicated at 4 while the opposite end is cut at an angle of approximately thirty degrees as indicated at 5.

Upon one face of the plate there is formed a protractor 6 which is outlined by the semicircular mark 7 about which the degrees of the circle may be laid off.

Between the ends of the arc 7 upon the radial center thereof an aperture 9 is formed which is countersunk at the underside of the plate as indicated at 10. Through this aperture is extended a stud 11, the lower end of which is provided with a head which positions in the countersink 10 the upper end of this stud being reduced and threaded as indicated at 12. The stud 11 is provided with a transverse slot 13 which, when the head is in position in the countersink, comes substantially into the plane of the top surface of the plate to receive one edge of a scale 14. This scale is graduated in inches and fractions thereof in the manner shown.

Placed over the stud 11 is a sleeve 15 and a thumb nut 16 threaded upon the upper end of the stud engages this sleeve and holds the same down in place against the scale 14, the lower edge of the sleeve being transversely notched as at 14a to receive the scale. It will thus be seen that the scale can be rotated with the stud to extend any angle desired from the protractor 6 and when the scale is reversed to extend from the edge 3 it may be used as a depth gauge by placing the edge 3 against a piece of work and extending the end of the scale into a cut or bore so that the depth thereof will be indicated on the scale at the adjacent edge of the plate.

Formed through the plate about the protractor 6 are a plurality of apertures 17 of graduated size, the size of each aperture being indicated upon the plate, so that the exact size of any desired drill may be readily determined by insertion into the apertures until one is located which snugly receives the drill.

From the foregoing description it will be readily seen that with the instrument herein described various measurements and calculations necessary in the work of a machinist may be easily made.

Having thus described my invention, what I claim is:—

An instrument of the character described, comprising a plate having a protractor scale on one face thereof and further having an aperture therethrough at the center of said scale, a bolt extended through said aperture and having a portion extending from one end of relatively large diameter, the other end of the bolt being threaded, said portion of large diameter of the bolt having a recess cut therein, a straight edge blade of a width substantially equal to the depth of the recess in the bolt and adapted to position therein to lie across the protractor, a sleeve encircling said bolt and having the interior formed from one end inwardly to receive the enlarged portion of the bolt, said sleeve being recessed at opposite points on the edge adjacent said blade to receive the same, and a thumb screw mounted upon the threaded portion of the bolt and bearing against said sleeve to secure the same in position upon the plate.

In testimony whereof I hereunto affix my signature.

JACOB ASH HUBER.